US010649724B2

(12) United States Patent
Van Wie

(10) Patent No.: US 10,649,724 B2
(45) Date of Patent: May 12, 2020

(54) VOICE INTERFACE FOR VIRTUAL AREA INTERACTION

(71) Applicant: Sococo, Inc., Austin, TX (US)

(72) Inventor: David Van Wie, Eugene, OR (US)

(73) Assignee: Sococo, Inc., Austin, TX (US)

( * ) Notice: Subject to any disclaimer, the term of this patent is extended or adjusted under 35 U.S.C. 154(b) by 908 days.

(21) Appl. No.: 14/997,301

(22) Filed: Jan. 15, 2016

(65) Prior Publication Data
US 2016/0139878 A1 May 19, 2016

Related U.S. Application Data

(63) Continuation of application No. 13/860,873, filed on Apr. 11, 2013, now abandoned, which is a continuation-in-part of application No. 13/860,801, filed on Apr. 11, 2013, now abandoned.

(60) Provisional application No. 61/637,461, filed on Apr. 24, 2012.

(51) Int. Cl.
G06F 3/16 (2006.01)
G10L 15/22 (2006.01)
H04L 12/58 (2006.01)
G06Q 50/00 (2012.01)

(52) U.S. Cl.
CPC .............. G06F 3/167 (2013.01); G06Q 50/01 (2013.01); G10L 15/22 (2013.01); H04L 51/043 (2013.01); H04L 51/046 (2013.01); H04L 51/18 (2013.01); G10L 2015/223 (2013.01); G10L 2015/225 (2013.01)

(58) Field of Classification Search
CPC ... G06F 3/167; G10L 15/22; G10L 2015/223; G10L 2015/225; G06Q 50/01; H04L 51/043; H04L 51/18; H04L 51/046; H04L 51/04; H04L 12/1827
See application file for complete search history.

(56) References Cited

U.S. PATENT DOCUMENTS

| 6,219,045 B1* | 4/2001 | Leahy ................ H04W 4/029 715/757 |
| 6,310,629 B1* | 10/2001 | Muthusamy ........ G06F 3/04815 704/246 |
| 9,116,989 B1* | 8/2015 | Ehlen ................ G06F 17/30554 |
| 2004/0176106 A1 | 9/2004 | Tendler |
| 2009/0240516 A1 | 9/2009 | Palestrant |
| 2009/0254843 A1* | 10/2009 | Van Wie ............. H04L 12/1822 715/757 |
| 2010/0245257 A1* | 9/2010 | Cragun .................. G06F 3/011 345/173 |

(Continued)

Primary Examiner — William L Bashore
Assistant Examiner — Daniel W Parcher

(57) ABSTRACT

Examples of interface systems and methods for voice-based interaction in one or more virtual areas that define respective persistent virtual communication contexts are described. These examples enable communicants to use voice commands to, for example, search for communication opportunities in the different virtual communication contexts, enter specific ones of the virtual communication contexts, and bring other communicants into specific ones of the virtual communication contexts. In this way, these examples allow communicants to exploit the communication opportunities that are available in virtual areas, even when hands-based or visual methods of interfacing with the virtual areas are not available.

20 Claims, 7 Drawing Sheets

(56) References Cited

U.S. PATENT DOCUMENTS

| | | | | |
|---|---|---|---|---|
| 2011/0223893 A1* | 9/2011 | Lau | ......................... | G10L 15/22 |
| | | | | 455/414.1 |
| 2012/0246582 A1 | 9/2012 | Leacock et al. | | |
| 2012/0265528 A1* | 10/2012 | Gruber | .................... | G10L 15/18 |
| | | | | 704/235 |
| 2013/0031475 A1* | 1/2013 | Maor | ..................... | G06Q 10/10 |
| | | | | 715/706 |

* cited by examiner

VOICE INTERFACE FOR VIRTUAL AREA INTERACTION

CROSS-REFERENCE TO RELATED APPLICATIONS

This application is a continuation of prior U.S. patent application Ser. No. 13/860,873, filed Apr. 11, 2013, which claims the benefit of U.S. Provisional Application No. 61/637,461, filed Apr. 24, 2012. This application also is a continuation of U.S. patent application Ser. No. 13/860,801, filed Apr. 11, 2013, which claims the benefit of U.S. Provisional Application No. 61/637,461, filed Apr. 24, 2012. The entirety of each of U.S. patent application Ser. No. 13/860, 873, U.S. patent application Ser. No. 13/860,801, and U.S. Provisional Application No. 61/637,461 is incorporated herein by reference.

This application relates to the following patent applications, the entirety of each of which is incorporated herein by reference:

U.S. application Ser. No. 12/354,709, filed Jan. 15, 2009;
U.S. application Ser. No. 12/418,243, filed Apr. 3, 2009;
U.S. application Ser. No. 12/509,658, filed Jul. 27, 2009;
U.S. application Ser. No. 12/630,973, filed Dec. 4, 2009;
U.S. patent application Ser. No. 12/631,026, filed Dec. 4, 2009;
U.S. application Ser. No. 12/818,517, filed Jun. 18, 2010;
U.S. application Ser. No. 12/825,512, filed Jun. 29, 2010;
U.S. application Ser. No. 12/855,210, filed Aug. 12, 2010;
U.S. application Ser. No. 13/209,812, filed Aug. 15, 2011;
U.S. application Ser. No. 13/229,349, filed Sep. 9, 2011;
U.S. application Ser. No. 13/432,837, filed Mar. 28, 2012;
U.S. application Ser. No. 13/604,360, filed Sep. 5, 2012;
U.S. application Ser. No. 13/680,463, filed Nov. 19, 2012; and
U.S. application Ser. No. 13/770,761, filed Feb. 19, 2013.

BACKGROUND

When face-to-face communications are not practical, people often rely on one or more technological solutions to meet their communications needs. Traditional telephony systems enable voice communications between callers. Instant messaging (also referred to as "chat") communications systems enable users to communicate text messages in real time through instant message computer clients that are interconnected by an instant message server. Some instant messaging systems and interactive virtual reality communications systems allow users to be represented by user-controllable graphical objects (referred to as "avatars"). What are needed are improved systems and methods for realtime network communications.

DETAILED DESCRIPTION

Figure 1:
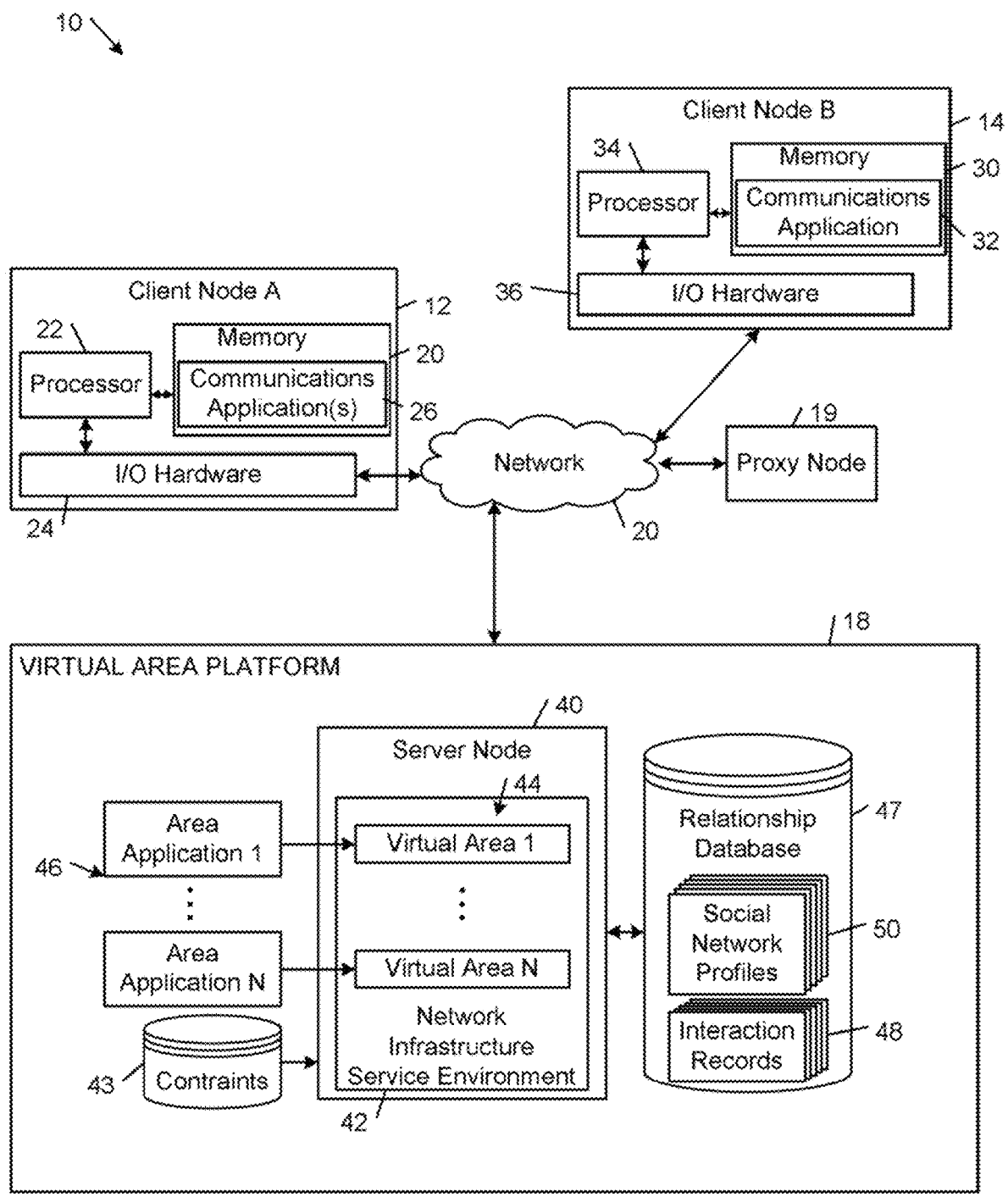
FIG. 1 is a diagrammatic view of an example of a network communications environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any tangible, non-transitory medium capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Examples of network nodes include, but are not limited to, a terminal, a computer, and a network switch. A "server" network node is a host computer on a network that responds to requests for information or service. A "client network node" is a computer on a network that requests information or service from a server.

A Uniform Resource Identifier (URI) is a string of characters that identifies a network resource.

A "network resource" is anything that can be identified by a uniform resource identifier (URI) and accessed over a network, including an electronic document, an image, a source of information, a service, operators and operands of a mathematical equation, classes, properties, numeric values, and a collection of other resources.

A "network connection" is a link between two communicating network nodes. A "connection handle" is a pointer or identifier (e.g., a uniform resource identifier (URI)) that can be used to establish a network connection with a network resource. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Examples of types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), screen shares, and file transfers.

A "virtual area" (also referred to as an "area," a "place," or a "space") is a representation of a computer-managed space or scene. Virtual areas typically are one-dimensional, two-dimensional, or three-dimensional representations; although in some examples a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization. A virtual area typically refers to an instance of a virtual area schema, where the schema defines the structure and contents of a virtual area in terms of variables and the instance defines the structure and contents of a virtual area in terms of values that have been resolved from a particular context.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

"Navigating" in the context of a virtual area means moving or changing an attentional focus or state of a user or another communicant with respect to the virtual area. For example, a user may navigate his or her attention from one virtual communication context to another (e.g., from one zone of a virtual area to another or from one virtual area to another). A user also may navigate his or her presence or the presence of another communicant from one virtual communication context to another (e.g., from one zone of a virtual area to another or from one virtual area to another).

As used herein, the term "includes" means includes but not limited to, the term "including" means including but not limited to. The term "based on" means based at least in part on.

II. VOICE-BASED VIRTUAL AREA NAVIGATION

The examples that are described herein provide systems and methods for voice-based navigation in one or more virtual areas that define respective persistent virtual communication contexts. These examples enable communicants to use voice commands to, for example, search for communication opportunities in the different virtual communication contexts, enter specific ones of the virtual communication contexts, and bring other communicants into specific ones of the virtual communication contexts. In this way, these examples allow communicants to exploit the communication opportunities that are available in virtual areas, even when hands-based or visual methods of interfacing with the virtual areas are not available (e.g., when people are driving, passing through an airport, putting out a forest fire, delivering packages, flying fighter jets, jogging, driving a forklift, and otherwise living their mobile lives).

FIG. 1 shows an example of a network communications environment 10 that includes a first client network node 12 (Client Node A), a second client network node 14 (Client Network Node B), a virtual area platform 18 and an optional proxy node 19 that are interconnected by a network 20. The network 20 may include one or more of any of a local area network (LAN), a metropolitan area network (MAN), and a wide area network (WAN) (e.g., the internet). The network 20 typically includes a number of different computing platforms and transport facilities that support the transmission of a wide variety of different media types (e.g., text, voice, audio, video, and other data) between network nodes.

The first client network node 12 includes a computer-readable medium 22 (or "memory"), a processor 24, and input/output (I/O) hardware 26 (including, e.g., a display and network communication hardware). The processor 24 executes at least one virtual area communications application 26 that is stored in the memory 22. The second client network node 14 typically is configured in substantially the same general way as the first client network node 12, with a computer-readable medium 30 storing at least one virtual area communications application 32, a processor 34, and I/O hardware 36.

Each of the network nodes 12, 14 has a respective set of one or more sources and an exemplary set of one or more sinks. Each source is a device or component that originates data of a particular data stream content type and each sink is a device or component that receives data of a particular data stream content type. A source and a sink of the same data stream content type are referred to herein as being "complementary." Exemplary sources include an audio source (e.g., an audio capture device, such as a microphone), a video source (e.g., a video capture device, such as a video camera), a chat source (e.g., a text capture device, such as a keyboard), a motion data source (e.g., a pointing device, such as a computer mouse), and other sources (e.g., file sharing source or a source of a customized real-time data stream). Exemplary sinks include an audio sink (e.g., an audio rendering device, such as a speaker or headphones), a video sink (e.g., a video rendering device, such as a display monitor), a chat sink (e.g., a text rendering device, such as a display monitor), a motion data sink (e.g., a movement rendering device, such as a display monitor), and other sinks (e.g., a printer for printing shared files, a device for rendering real-time data streams different from those already described, or software that processes real-time streams for analysis or customized display). Each source has an active state in which the source is available for originating data and an inactive state in which the source is not available for originating data. Likewise, each sink has an active state in which the sink is available for receiving data and an inactive state in which the sink is not available for receiving data. The communicants operating the client nodes 12, 14 typically can control the states of the sources and sinks using controls provided by the communications applications 26, 32. For example, in some examples, the communications applications 26, 32 provide user controls for turning on/off the local microphones and the local speakers (e.g., headsets) on the client network nodes 12, 14.

The virtual area platform 18 includes at least one server network node 40 that provides a network infrastructure service environment 42 that manages sessions of the first and second client nodes 12, 14 in one or more virtual areas 44 in accordance with respective virtual area applications 46. One or more of the virtual area applications 44 typically are synchronous conferencing applications that support one or more types of communications between the client nodes 12, 14 (e.g., text chat, audio conferencing, video conferencing, application sharing, and file sharing). The network infrastructure service environment 42 typically includes one or more network infrastructure services that cooperate with the communications applications 26, 32 in the process of establishing and administering network connections between the client nodes 12, 14 and other network nodes. Among the network infrastructure services that are included in the example of the network infrastructure service environment 42 are an account service, a security service, an area service, a rendezvous service, an interaction service, and a capabilities engine. The area service administers a virtual area 44 by managing sessions of the first and second client nodes 12, 14 in the virtual area 44 in accordance with the virtual area application 46. Examples of the virtual area platform 18 and the virtual area applications 46 are described in U.S. Provisional Patent Application No. 61/563,088, filed Nov. 23, 2011. Examples of an account service, a security service, an area service, a rendezvous service, and an interaction service are described in U.S. patent application Ser. No. 12/630,973, filed Dec. 4, 2009. Examples of a capabilities engine are described in U.S. Provisional Patent Application No. 61/535,910, filed Sep. 16, 2011.

The network infrastructure service environment 42 maintains a relationship database 47 that contains the records 48 of interactions between communicants and social network profiles 50 that are associated with respective communicants. Each interaction record describes the context of an interaction between a pair of communicants. Each social network profile 50 typically includes: identity characteristics (e.g., name, age, gender, and geographic location information such as postal mailing address) that describe a respective communicant or a persona that is assumed by the communicant; explicit relationship information that is declared by the communicant; and relationship information that is inferred from the communicant's interactions in the network communication environment 10. Additional details regarding the relationship database 47 and the search and retrieval functionalities associated with the relationship database as described in U.S. patent application Ser. No. 12/354,709, filed Jan. 15, 2009, U.S. patent application Ser. No. 12/418,243, filed Apr. 3, 2009, U.S. patent application Ser. No. 12/631,026, filed Dec. 4, 2009, and U.S. patent application Ser. No. 13/432,837, filed Mar. 28, 2012.

Some examples provide systems and methods for encapsulating assemblies (e.g., meetings, informal gatherings, and the like) of communicants in one or more virtual areas based on information obtained from the interactions records 48. These examples provide a wide variety of ways in which to capture features of ongoing and completed assemblies and visualize those features at different levels of detail. Exemplary visualizations include an activity view that shows a time-based visualization of assemblies within a particular domain, and a timeline view that shows a scalable visualization of a selected subset of the assemblies within a particular domain. The domain may be predefined or specified by a user and may be used to select the assemblies that are presented in the visualizations. The assemblies may be filtered according to a variety of different attributes of the assemblies, including by virtual location (e.g., a particular virtual area or a particular zone of a virtual area in which the assemblies occurred), by communicant (e.g., one or more communicants who participated in the assemblies), and by time (e.g., a period during which the assemblies started or ended). The assembly visualizations allow communicants to readily obtain a quick summary of the activities occurring in a particular context (e.g., one or more of time, virtual location, participants involved, and types of information shared). They also increase the availability of assembly related information (e.g., notes, shared files, recordings, follow-up tasks, comments and other feedback) by allowing communicants to see and retrieve the information associated with the assemblies in a variety of different ways. Examples of systems and methods of encapsulating and visualizing assemblies of communicants in virtual areas are described in U.S. patent application Ser. No. 13/432,837, filed Mar. 28, 2012.

The communications applications 26, 32, the area applications 46, and the network infrastructure service environment 42 together provide a platform that administers the realtime connections with network nodes in an instance of a virtual area subject to a set of constraints 43 (e.g., capabilities and other types of permissions, rules, and preferences). Each of the virtual area applications 46 is hosted by a respective one of the virtual areas 44 and includes a description of the respective virtual area 44. Communicants respectively operating the client nodes 12, 14 connect to the virtual areas 44 through the virtual area communications applications 26, 32.

The communications applications 26, 32 typically present respective views of the virtual areas 44 in accordance with data received from the network infrastructure service environment 42. The communications applications 26, 32 also provide respective interfaces (e.g., one or more of a voice input interface, and audio output interface, and a visual graphical user interface) for receiving commands from the communicants. In visual graphical user interfaces, communicants typically are represented in the virtual areas 44 by respective avatars (e.g., sprites). In audio output interfaces, communicants' states and activities are described using audio signals (e.g., synthesized speech). Communicant avatars typically move about the virtual areas 44 in response to commands that are input by the communicants at their respective network nodes. In some examples, the communications applications 26, 32 establish realtime data stream connections between the first and second client network nodes 12, 14 and other network nodes connected to the virtual area 44 based on the positions of the communicants' avatars in the virtual areas 44. In some examples, each of the client network nodes 12, 14 includes a respective realtime kernel of the type described in U.S. patent application Ser. No. 12/630,973, filed Dec. 4, 2009, which supports remote configuration of stream handlers for processing data streams (e.g., rendering audio and video data streams) on a client network node.

A virtual area 44 may correspond to an abstract (non-geometric) virtual area that is defined with respect to abstract coordinates, or a visual virtual area that is defined with respect to one-, two- or three-dimensional geometric coordinates. Abstract virtual areas may or may not be associated with respective visualizations, whereas visual virtual areas are associated with respective visualizations.

In some of the examples that are described herein, the virtual areas are visual virtual areas of the type disclosed in U.S. Pat. Nos. 7,769,806 and 7,844,724. These visual virtual areas include physical geometry and collision geometry. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be painted onto the visual geometry and the texture, color, or intensity near the lighting effects may be modified. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

Some examples of the virtual area platform 18 enable software application designers to define the semantics of position in an abstract virtual area (e.g., a software application or a computer data file). Through associations with respective connection rules, these position definitions can be used, for example, to drive connections to virtual areas, entries into virtual areas, connections to communicants and other sources or sinks of realtime data streams, and determinations of presence data relating to communicants, network resources, and network services. Additional details regarding systems and methods of defining the semantics of position in abstract virtual areas are described in U.S. application Ser. No. 12/631,008, which was filed on Dec. 4, 2009.

A virtual area typically includes one or more zones. A zone may be a rendered spatial extent, a set of rules applied to a spatial extent, or both. Zones may be arranged hierarchically in a virtual area, with an outermost zone (referred to herein as the "Global Governance Zone") enclosing all other zones in the virtual area. Within the Global Governance Zone, there can be location zones (e.g., rooms of a virtual area) or smaller governance zones that enclose a group of location zones and provide regions of governance on the map. A zone definition typically also includes one or more channel definitions that describe how to create respective channels in the zone and specify the information about the channel that is published to a client network node that becomes present in the zone. A channel is always uniquely defined point-to-point and is unique to a virtual area application and a session between a client network node and the virtual area platform.

Examples of the types of rules that may be associated with a zone include switching rules, governance rules, and permission rules.

Switching rules govern realtime stream connections between network nodes that are linked to the virtual area (e.g., network nodes that are associated with objects, such as avatars, in the virtual area). The switching rules typically include a description of conditions for connecting sources and sinks of realtime data streams in terms of positions in the virtual area. Each switching rule typically includes attributes that define the realtime data stream type to which the rule applies and the location or locations in the virtual area where the rule applies. In some examples, each of the rules optionally may include one or more attributes that specify a required role of the source, a required role of the sink, a priority level of the stream, and a requested data routing topology. In some examples, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the area clients or only to respective connections with individual area clients. An example of a policy rule is a proximity policy rule that only allows connections of sources with compatible sinks that are associated with respective objects that are within a prescribed distance (or radius) of each other in the virtual area. The network connections between network nodes may be arranged in a variety of different data routing topologies, including a peer-to-peer topology, a mediated topology (i.e., a topology in which connections between network nodes are mediated by another network node, such as a server network node, a client network node, or a network switch), and hybrid architectures that combine aspects of peer-to-peer and mediated architectures. In some examples, the switching rules dictate how local connection processes executing on each of the network nodes establishes communications with the other network nodes based on the locations of the associated objects in the zones of the virtual area. A switching rule also may define a direct connection between network nodes or an indirect connection through an intermediate network node (e.g., the proxy node 19 shown in FIG. 1).

Governance rules control who has access to resources (e.g., the virtual area itself, regions with the virtual area, and objects within the virtual area), who has access to data (e.g., data streams and other content) that is associated with the virtual area, what is the scope of that access to the data associated the virtual area (e.g., what can a user do with the data), and what are the follow-on consequences of accessing that data (e.g., record keeping, such as audit logs, and payment requirements). In some examples, an entire virtual area or a zone of the virtual area is associated with a "governance mesh" that enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

A permission rule defines a respective capability requirement (e.g., for a respective action, behavior, or state) in terms of one or more capabilities, attributes, and settings, which may be persistent or transient. Examples of permission rules include: a rule that conditions a communicant's ability to enter a target zone on the communicant having a CanEnterZone capability for the target zone; a rule that conditions the ability of a grantee communicant to open a target door of a target room on the grantee communicant having a CanOpenDoor capability for the target room; and a rule that conditions the transmission of a message describing the state of a particular communicant's avatar in a zone to a recipient having a CanSeeState capability for the particular communicant in the zone. A capability provides permission for a client to perform some action within the application. For example, a client may be granted the capability "CanEnterZone" for a specific zone within a virtual area that has been defined with that capability requirement. The client that has the capability can enter the zone, whereas a client without the capability would have their RDS state change rejected when they tried to enter the zone. Examples of capabilities systems for administering permission rules are described in U.S. Provisional Patent Application No. 61/535,910, filed Sep. 16, 2011.

As explained above, the zones of a virtual area can be associated with respective switching rules, each of which instructs the area service to connect sources of a respective data stream type that are associated with a designated source zone with sinks of the respective realtime data stream type that are associated with a designated sink zone. Network nodes can establish respective presences in the zones of a virtual area. In some examples, network nodes associated with respective objects (e.g., avatars representing the communicants operating the network nodes) that can be moved to different locations in the virtual area, and the network nodes are present in the zones in which the associated objects are located. The area service administers data stream connections between the network nodes based on the switching rules, the respective sources and sinks associated with the network nodes, and the respective zones of the virtual area in which the objects are located.

Figure 2:
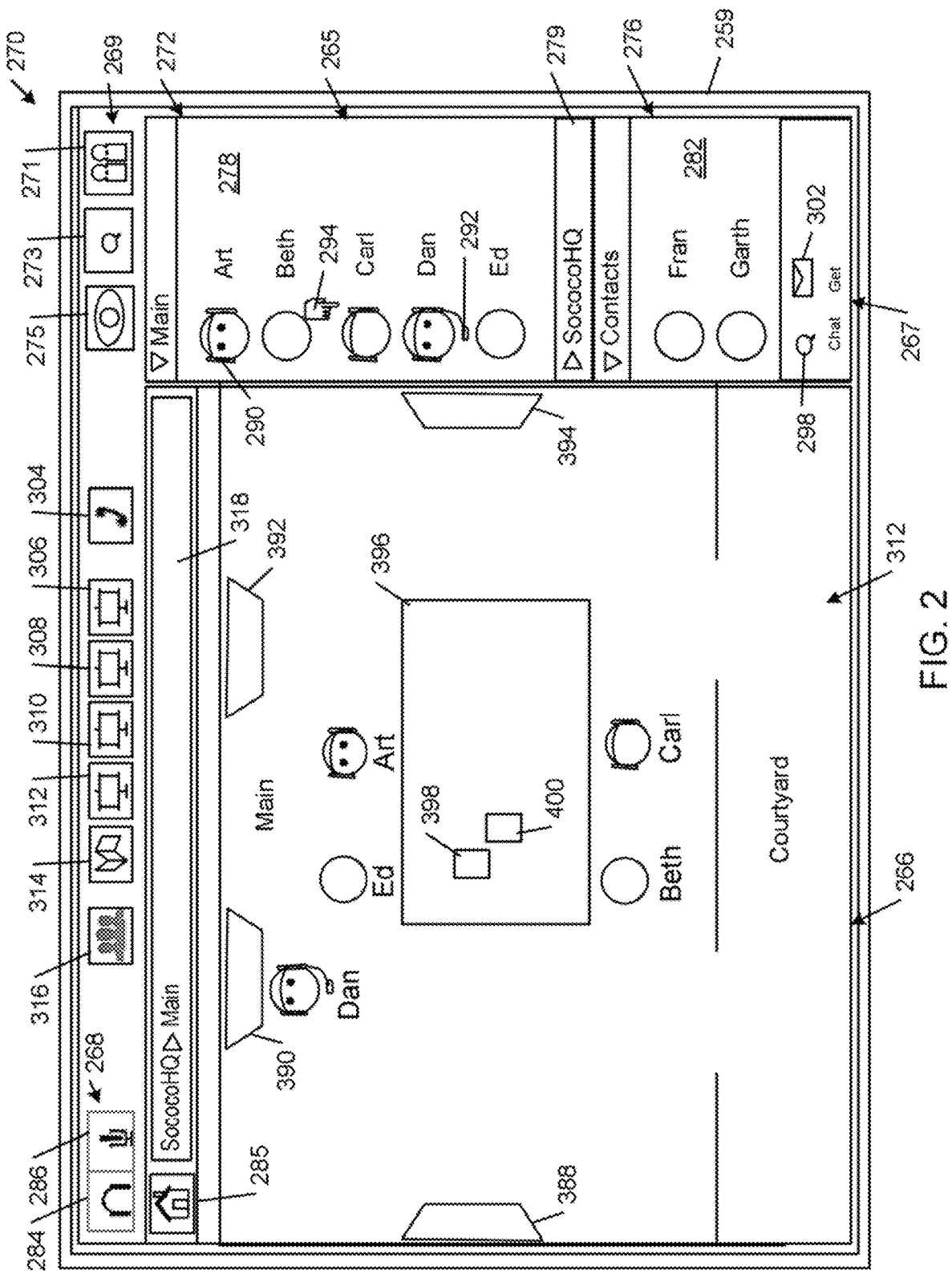
FIG. 2 is a diagrammatic view of an example of a graphical user interface.

FIG. 2 shows an exemplary graphical user interface 270 that is generated by an example of the communications application 26 in a window 259 on a display of the client network node from which a user of the client application ("Art" in this example) is operating. The graphical user interface 270 includes a people panel 265, a viewer panel 266, a people interaction toolbar 267, an audio interaction toolbar 268, and a set of panel view controls 269. The panel view controls 269 include a people panel button 271 for opening and closing the people panel 265, a chat panel button 273 for opening and closing a chat panel, and a viewer panel button 275 for opening and closing the viewer panel 266.

The people panel 265 depicts the realtime availabilities and activities of some or all of Art's contacts across different communication contexts. In the example shown in FIG. 2, the people panel 265 shows Art's communicants segmented into a virtual area section 272 and a contacts group section 276. The virtual area section 272 shows the presence and activity states in each of the area applications 44 of which Art is a member with respect to which at least one of Art and Art's contacts is present. The contacts group section 276 contains all or a selected portion of Art's contacts that are not represented in any of the virtual area sections. In the example shown in FIG. 2, the virtual area section 272 includes a section 278 corresponding to the user's current zone of presence (i.e., the Main zone in the SococoHQ virtual area) and a section (labeled with a header bar 279 entitled "SococoHQ") that identifies all the communicants who have a presence in the area application "SococoHQ," and contains the graphical representations of the communicants (including at least one of Art or Art's contacts) who currently have presence in the SococoHQ area application 44 and are not in the current zone of presence. The contacts group section 276 is labeled with a header bar entitled "Contacts" and contains graphical representations of some or all of Art's contacts who are not shown in the virtual area section 272 (i.e., they either are not members of or not present in SococoHQ).

Each communicant is represented graphically by a respective circular sprite that is labeled with a respective user name of the communicant (i.e., "Art," "Beth," "Carl," "Dan," "Ed," "Fran," and "Garth"). Each sprite also may be associated with a respective status line that includes additional information about the communicant. In some embodiments, each status line can include one or more of the following information: location of presence (e.g., a virtual area application or a zone of that sever application); availability (e.g., busy, idle); a status message (e.g., "Out of the office next Wednesday"); and the name of the client node from which the communicant is operating (e.g., "workstation 1" or "mobile phone"). In some embodiments, the ordering of the spatial positions (e.g., from top to bottom) of the communicant avatars in each of the sections 272, 276 is alphabetical by user name. In other embodiments, the spatial positions of the communicant avatars in the area application section 272 are ordered in accordance with the temporal ordering of the communicants in terms of the times when the communicants established their presences in the area application. The spatial positions of the communicant avatars in the contacts section 276 may be sorted alphabetically by user name, according to frequency of contact, according to recentness of contact, or according to other sorting or filtering criteria.

The activities of the communicants in the contexts of the area applications 44 may be inferred by the client communications application from activities on various communication channels over which the respective communicants are configured to communicate. The activities on the communication channel are represented in the graphical user interface 270 by visual cues that are depicted in association with the graphical representations of the communicants in the virtual area section 272 and the contacts section 276. For example, the "on" or "off" state of a communicant's local speaker channel is depicted by the presence or absence of a headphones graphic 290 on the communicant's sprite. When a communicant's speakers are on, the headphones graphic 290 is present (see sprites Art, Carl, and Dan) and, when a communicant's speakers are off, the headphones graphic 290 is absent (see sprites Beth and Ed). The "on" or "off" state of the communicant's microphone is depicted by the presence or absence of a microphone graphic 292 on the communicant's sprite. When a communicant's microphone is on, the microphone graphic 292 is present (see sprite Dan); and, when a communicant's microphone is off, the microphone graphic 292 is absent (see sprites Art, Beth, Carl, and Ed). The headphones graphic 290 and the microphone graphic 292 provide visual cues of the activity states of the communicant's sound playback and microphone devices. In addition, the current activity state of a communicant's microphone channel is indicated by a dynamic visualization that lightens and darkens the communicant's avatar in realtime to reflect the presence or absence of audio data on the microphone channel. Thus, whether or not their local speakers are turned on, communicants can determine when another communicant is speaking by the "blinking" of the coloration of that communicant's avatar. The activity state of a communicant's text chat channel is depicted by the presence or absence of the hand graphic 294 adjacent the communicant's sprite (see sprite Beth). Thus, when a communicant is transmitting text chat data to another network node the hand graphic 294 is present, and when a communicant is not transmitting text chat data the hand graphic 294 is not present. In some embodiments, text chat data is transmitted only when keyboard keys are depressed, in which case the visualization of the communicant's text channel appears as a flashing on and off of the hand graphic 294.

Members of an area application are able to receive the visual cues of the communicant activities occurring in the context of that area application whether or not the member is present. For example, the graphical user interface 270 that is presented to Art can show visual cues indicating the communication channel activity states of the communicants who are present in the SococoHQ virtual area (where Art is present) and the communication channel states of the communicants who are present in other areas of which Art is a member but not currently present.

The audio interaction toolbar 268 includes a headphone control 284 that enables Art to toggle on and off the local speakers of the client network node, and a microphone control 286 that enables Art to toggle on and off the local microphone of the client network node.

Additional details regarding embodiments of the people panel 265 are described in U.S. Provisional Patent Application No. 61/373,914, filed Aug. 16, 2010, and U.S. patent application Ser. No. 12/354,709, filed Jan. 15, 2009.

The people interaction toolbar 267 includes a Chat button 298 and a Get button 302. Selection of the Chat button 298 opens a Chat panel 340 (see FIG. 5) that enables Art to initiate a chat with other communicants who are present in the area application where Art is present (i.e., SococoHQ in the illustrated example). Selection of the Get button 302 opens an Invite window that enables Art to invite one or more communicants to a selected virtual area location (e.g., an area application or zone within that area application). Additional details regarding embodiments of the methods and functions invoked by the Chat button 298 and the Get button 302 are described in U.S. patent application Ser. No. 12/354,709, filed Jan. 15, 2009, and U.S. Provisional Patent Application No. 61/373,914, filed Aug. 16, 2010.

In addition to the control and panel elements of the graphical user interface 270 (e.g., the people panel 265, the viewer panel 266, the people interaction toolbar 267, the audio interaction toolbar 268, and the panel view controls 271, 273, 275), the graphical user interface 270 includes a Phone button 304, a respective View Screen button 306, 308, 310, 312 for each viewscreen in the current zone of presence, a Map button 314, and a meeting button 316. The Phone button 304 is associated with telephony related functionality of the platform that enables a user of a Public Switched Telephone Network (PSTN) terminal device to participate in virtual area based communications (e.g., by the PSTN terminal device user calling into a zone of the virtual area or by a user of the communications application 26 to call out to the PSTN terminal device user), as described in U.S. patent application Ser. No. 13/165,729, filed Jun. 21, 2011, and communicants involved in telephony communications are represented by avatars that are decorated with a graphical representation of a telephone (see, e.g., the avatar 113 in Carl's Office shown in FIG. 3). Each of the View Screen buttons 306-312 sets the viewer panel 266 to display the content the content being shared in connection with a corresponding one of the viewscreen objects in the current zone of presence or, if no content is being shared in connection with the current viewscreen object, to display a Share button that allows the user to initiate a screen sharing session in connection with the selected view screen object. The Map button 314 sets the view presented in the viewer panel 266 to a map view of the virtual area. The Meeting button 316 sets the view presented in the viewer panel 266 to a meeting user interface for visualizing assemblies of communicants in the virtual area, as described in U.S. patent application Ser. No. 13/432,837, filed Mar. 28, 2012. The graphical user interface 270 also includes a home button 285 that is associated with a control that returns the user's presence to a designated "home" location in the virtual environment (e.g., a designed zone, such as a personal zone or other office that is assigned to the user). Additional details regarding the structure, function, and operation of examples of the navigation controls are described in U.S. patent application Ser. No. 12/354,709, filed Jan. 15, 2009.

FIG. 2 shows an example of the graphical user interface 270 in the Map view mode, which presents in the viewer panel 266 a rendered view of the user's current zone of presence (Main) of the SococoHQ virtual area, which is located at the location SococoHQ/Main as indicated in the location bar 318. This address indicates that Main is a zone within the area SococoHQ.

Each of the communicants who is present in the virtual area is represented graphically in the viewer panel 266 by a respective avatar that corresponds to the communicant's avatar shown in the people panel 265. The virtual area is represented graphically by a two-dimensional top view of a rectangular space. In some examples, the communicants' sprites automatically are positioned in predetermined locations (or "seats") in the virtual area when the communicants initially enter the virtual area.

The Main zone includes four view screen props (or "objects") 388, 390, 392, 394 and a table prop 396. Communicants interact with the props by selecting them with an input device (e.g., by single-clicking on the props with a computer mouse, touch pad, touch screen, or the like). The view screen props 388-394 are associated with application sharing functionality of the platform that enables communicants to share applications operating their respective client network nodes. The application sharing functionality is invoked by activating a view screen (e.g., by single-clicking the view screen object with an input device). In some embodiments, the platform provides visual cues that indicate whether or not a communicant is sharing an application over an application sharing channel. In response to a communicant's selection of the view screen prop, the communicant's sprite automatically is moved to a position in the graphical representation of the virtual area that is adjacent the view screen prop. The position of a communicant's sprite adjacent the view screen prop indicates that the communicant currently is sharing or is about to share an application with the other communicants in the virtual area. In addition, the avatar of each communicant who is viewing a shared application is depicted with a pair of "eyes" to indicate that the represented communicants are viewing the content being shared in connection with the view screen props (see, e.g., the avatars of Art and Dan in FIG. 2). The graphical depiction of view screen prop is changed depending on whether or not an active application sharing session is occurring. For example, the depicted color of the view screen may change from a brighter color during an active application sharing session to a darker color when there is no application sharing taking place. Examples of the application sharing process are described in connection with FIGS. 26-28 of U.S. patent application Ser. No. 12/354,709, filed Jan. 15, 2009, and in U.S. patent application Ser. No. 12/418,270, filed Apr. 3, 2009.

In some examples, one or more of the viewscreen props 388-394 may be associated with respective uniform resource identifiers (URIs) of network resources to enable communicants to interact with and share information associated with the network resources via the application sharing (e.g., web browser sharing) functionality associated with the viewscreen objects as described in U.S. Provisional Patent Application No. 61/444,989, filed Feb. 21, 2011.

The table prop 396 is associated with file share functionality of the platform that enables communicants to upload computer data files to server storage in association with the virtual area and to download data files that are associated with the virtual area from the server storage to the respective client network nodes. In example shown in FIG. 2, there are two document objects 398, 400 that are associated with the table prop 396. The document objects 398, 400 are linked to respective documents that are have been shared in the virtual area and stored in server storage. Any of the document objects 398, 400 may be selected by a communicant (e.g., by double-clicking the document object 398 with an input device, such as a computer mouse) to initiate downloading of the associated document to the communicant's client network node. Additional details regarding the structure, function, and operation of the table prop 396 may be obtained from U.S. patent application Ser. No. 12/354,709, filed Jan. 15, 2009.

The virtual area platform 18 enables a wide variety of highly customizable virtual area applications to be created. Examples of such applications include virtual area applications for creating a virtual office, a virtual personal space, a virtual art gallery, a virtual concert hall, a virtual auditorium, a virtual conference room, and a virtual clubhouse. The virtual area platform 18 supports the creation of network connections between network nodes in the same zone of a virtual area, as well as the creation of one-way or two-way data stream connections between network nodes in different zones.

A virtual area typically is associated with a specific set of communicants (e.g., members of the virtual area) and a plurality of persistent zones that define respective sub-contexts within the virtual area. Each zone of a virtual area may support an independent communication session between the network nodes in the zone. For example, a virtual area may include zones in which audio, video, and text chat channel connections are established only between the sources and sinks of network nodes that are in the same zone. In addition, one or more attributes or other data (e.g., a name, a designated purpose, membership, or associated history of interaction in the zone) may be associated with a virtual area zone to define a specific persistent virtual communication context that represents a particular persistent communication opportunity within the virtual area for organizing a communicant's communications with others. In some examples, the visual and audio interfaces that are provided on the client network nodes are configured to present all the independent communication sessions that are occurring in the virtual area. This allows a user to visualize (through sight or imagination) multiple concurrent independent communication interactions and thereby quickly learn who is meeting with whom and the contexts of those meetings (as defined by the zones in which the meetings are occurring).

Figure 3:
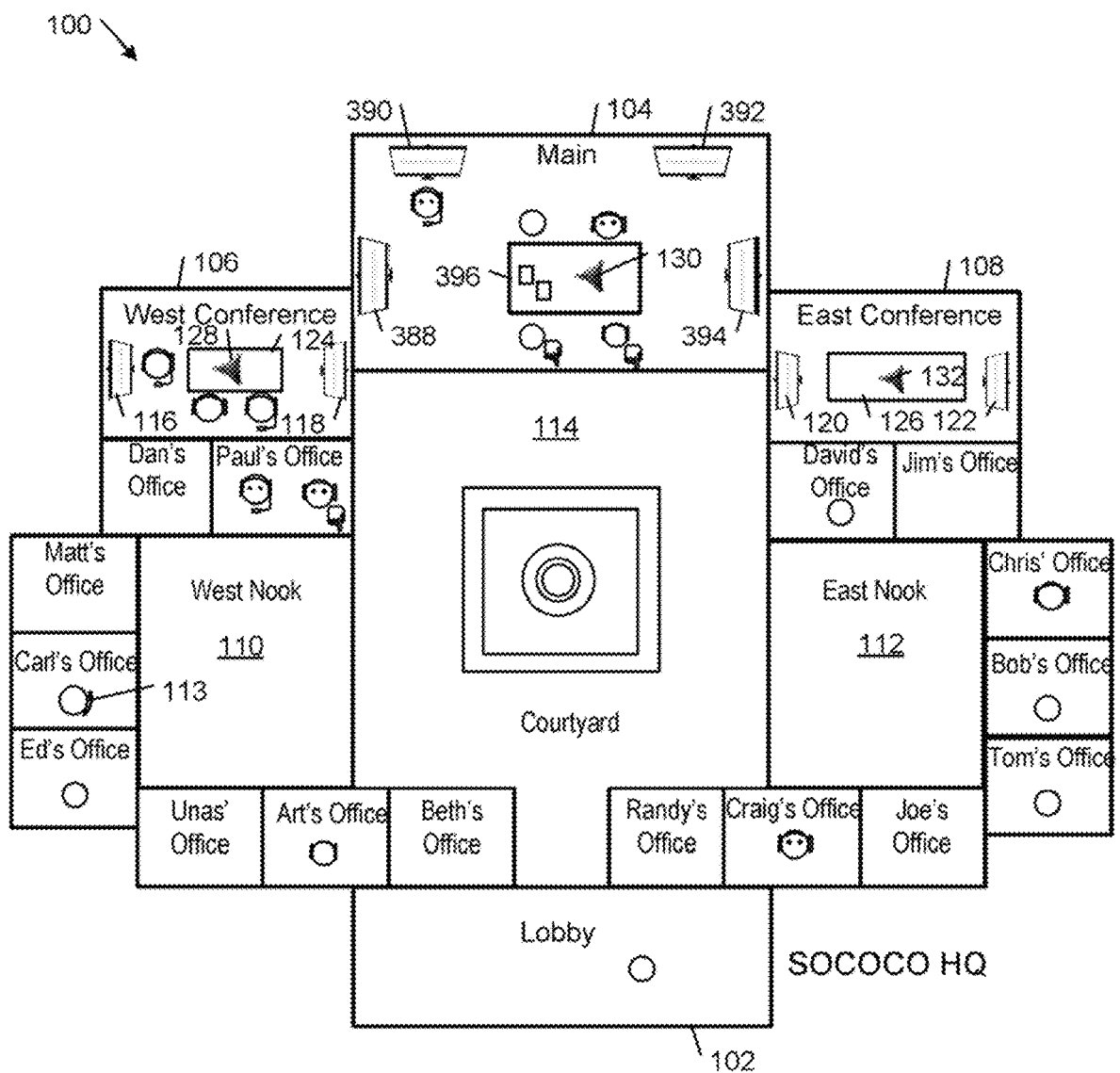
FIG. 3 is a diagrammatic view of an example of a graphical user interface.

FIG. 3 shows an example of a two-dimensional visualization of the Sococo HQ virtual area 100. The Sococo HQ virtual area includes a lobby 102, a Main conference room 104, a West Conference room 106, an East Conference room 108, a West Nook zone 110, an East Nook zone 112, a Courtyard zone 114, and sixteen offices. Each of the conference rooms 104-108 includes respective viewscreen objects 116-122 and 388-304, table objects 124, 126, and 396, and respective telephone objects 128, 130, 132 and supports realtime audio, chat, and application and network resource sharing communications between the network nodes in the same conference room. Each of the offices includes respective viewscreen objects (not shown) and a respective telephony object (not shown) and supports realtime audio, chat, and application and network resource sharing communications between the network nodes in the same office. Each of the telephony objects supports shared dial-in and dial-out telephony communications as described in U.S. patent application Ser. No. 13/165,729, filed Jun. 21, 2011. Each of the West Nook 110, East Nook 112, and Lobby 102 zones respectively supports realtime audio and chat communications between the network nodes in the same zone. The communication properties of an example of the virtual area 100 are described in U.S. Provisional Patent Application No. 61/603,024, filed Feb. 24, 2012.

Figure 4:
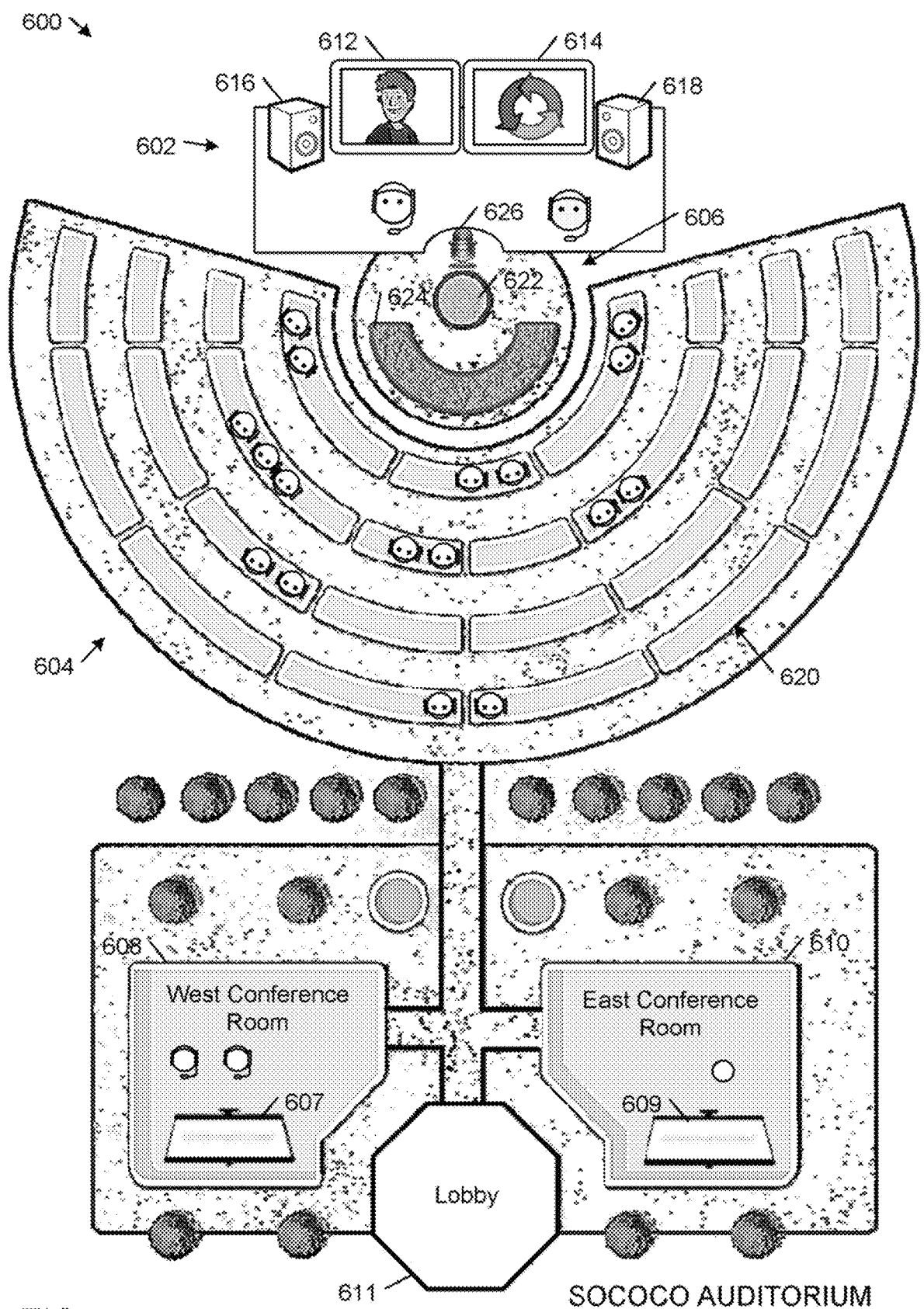
FIG. 4 is a diagrammatic view of an example of a graphical user interface.

FIG. 4 shows and example of a virtual area 600 that includes zones and is associated with a visualization of an auditorium ("Sococo Auditorium"). The virtual area 600 includes a stage (or podium) zone 602, a general seating zone 604, a question-and-answer zone 606, a West Conference Room 608, an East Conference Room 610, and a Lobby 611. The stage zone 602 includes viewscreen objects 612, 614 and speaker props 616, 618. The general seating zone 604 includes a plurality of sub-zones 620 (referred to herein as "bench zones") defining locations where network nodes are permitted to be present in the general seating zone 604. The question-and-answer zone 606 includes a microphone sub-zone 622, a queuing sub-zone 624, and a microphone prop 626. Each of the West Conference Room 608 and the East Conference Room 610 includes a respective viewscreen object 607, 609. The communication properties of an example of the virtual area 600 are described in U.S. Provisional Patent Application No. 61/603,024, filed Feb. 24, 2012.

Figure 5:
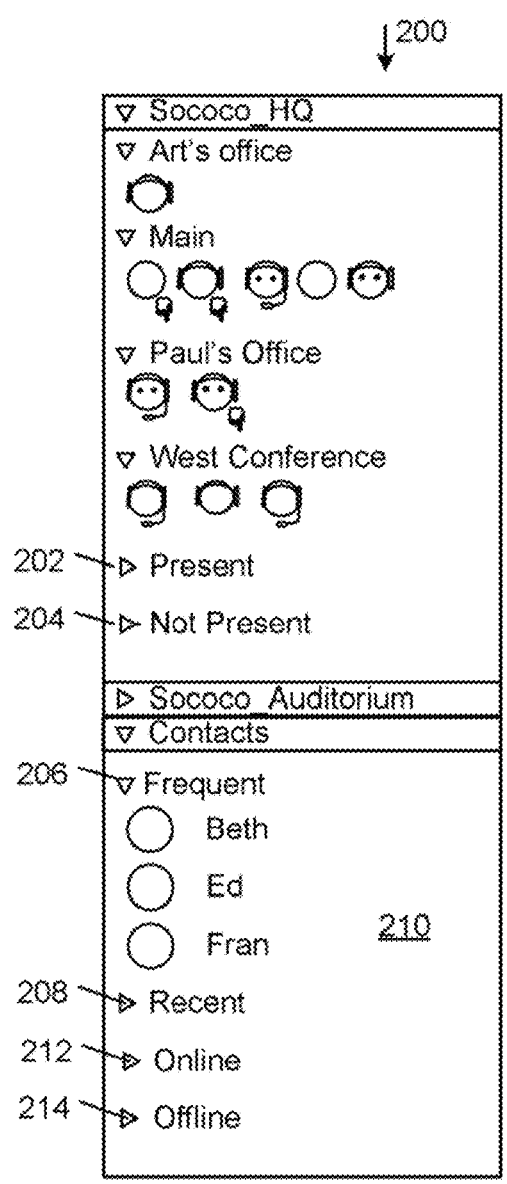
FIG. 5 is a diagrammatic view of an example of a graphical user interface.

FIG. 5 shows an example 200 of the people panel 265 of the graphical user interface 270 that depicts the realtime availabilities and activities of some or all of the contacts of a target communicant ("Art" in this example) across the different communication contexts provided by the Sococo HQ virtual area 100 and the Sococo Auditorium virtual area 600. The people panel 200 includes a separate section for each of the areas of which Art is a member and a separate Contacts section. Art's current area of presence ("Sococo HQ") is shown at the top.

Within the current area of presence section, the people panel 265 shows Art's current zone of presence ("Art's Office") at the top, followed by the zones of co-presence ("Main," "Paul's Office," and "West Conference"). The Zone of Co-Presence filtering criteria identifies those communicants who are co-present within a particular zone of a virtual area application. Thus, for each virtual area application, each group of two or more communicants who are present within the same zone of the virtual area application is listed in a separate, selectively expandable and collapsible Zone of Co-Presence area 130 of the graphical user interface 128. The depiction of the zones of co-presence involving some or all of Art's contacts enables Art to readily visualize all of the conversations that are occurring across all of the communication contexts that are defined by the virtual area applications of which Art is a member. In this way, Art can determine whether or not there are any ongoing conversations that he would like to join.

In addition, for each area application of which Art is a member and with respect to which at least one of Art and Art's contacts is present, the members of the area application are segmented by the status of their presence with respect to the area application. Thus, the members of Sococo HQ are sorted into a Present group 202 and a Not Present group 204. (The members of Sococo Auditorium also are sorted into a Present group and a Not Present group.) In this way, Art readily can visualize who is present and which members are not present in each area application. Each of the groups 202-204 are labeled with a respective "Present" or "Not Present" label that is associated with a respective toggle control that can be toggled to selectively collapse and expand the associated group 202-204. The contacts section 210 labeled with a header bar entitled "Contacts" that identifies all of Art's contacts who are not shown in any of the Sococo HQ and Sococo Auditorium sections (i.e., they either are not members of or not present in any of Sococo HQ and Sococo Auditorium).

Additional filtering criteria include a Frequent contacts group 206 in which Art's contacts are sorted by the frequency of their respective interactions with Art, a Recent contacts group 208 in which Art's contacts are sorted by the recentness of their respective interactions with Art, an Online contacts section 212 that lists all of Art's contacts who currently are online (i.e., connected to the network 20), and an Offline contacts group 214 that lists all of Art's contacts who currently are offline (i.e., disconnected from the network).

Figure 6:
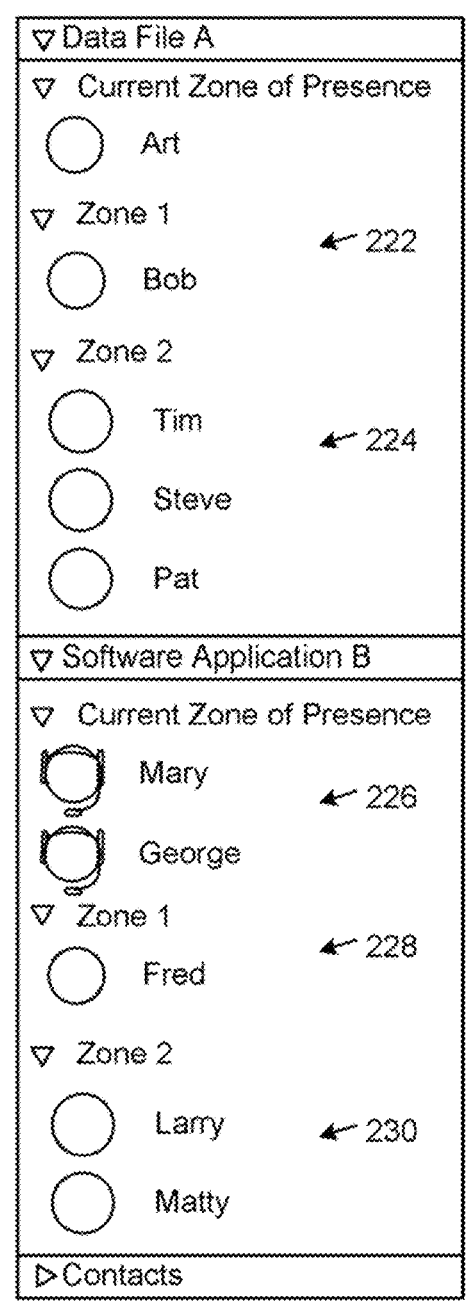
FIG. 6 is a diagrammatic view of an example of a graphical user interface.

FIG. 6 shows an embodiment of a graphical user interface 220 that depicts the realtime availabilities and activities of some or all of the contacts of a target communicant ("Art" in this example) across different communication contexts defined by a data file A and a software application B. The software application B may be any type of software application, including consumer and business software applications (e.g., a personal information manager software application, such as the Microsoft® Outlook® software application; a document processing software application, such as the Microsoft® Word® software application; a spreadsheet software application, such as the Microsoft® Excel® software application, and a web browser software application, such as the Microsoft® Internet Explorer® software application). In this embodiment, for each data file and software application B of which Art is a member and with respect to which at least one of Art and Art's contacts is present, the members of the virtual area application are segmented by the status of their presence with respect to the data file or software application. In this example, Art is member of Data File A and Software Application B. Thus, the members of Data File A are sorted into a Present group 222 and a Not Present group 224, and the members of Software Application B are sorted into a "Zone of Co-Presence" group 226, a Present group 228 and a Not Present group 230, where the zones correspond to respective sections of the Data File A and the Software Application B. In this way, Art readily can visualize who is present and which members are not present in each of the data files and software applications of which he is a member.

Examples of the people panels 200, 220 are described in U.S. patent application Ser. No. 13/209,812, filed Aug. 15, 2011.

As explained above, the examples that are described herein provide systems and methods for voice-based navigation in one or more virtual areas that enable communicants to exploit the communication opportunities that are available in such virtual area contexts, even when hands-based or visual methods of accessing such opportunities are not available. In some examples, the voice-based navigation functionalities enable a user to obtain sufficient information to visualize in his or her mind essential aspects of the visual information shown in the graphical user interfaces described above in connection with FIGS. 2-6. Through voice commands and audio feedback, for example, a user can navigate multiple multi-zone virtual areas to determine what is going on in a particular virtual area or zone (e.g., where are communicants located and what are they doing—talking, text chatting, application sharing, communicating over a telephony network, or simply co-present with another communicants), or determine what a specific communicant is doing (e.g., is the communicant online or offline, where the communicant present, and what is the communicant currently doing).

Among the statuses that a user of the voice-based navigation system can ascertain about a communicant are statuses of the states and activities of the communicant in one or more of the virtual area applications 46.

Exemplary communicant states include:

| STATE | DESCRIPTION | ATTRIBUTES |
|---|---|---|
| Online/Offline State | Is this communicant available now? | Online/Offline |
| Location of Presence | Where is this communicant? | Application (or Zone within Application) of Primary Focus |
| Application-Specific Identity Information | Who is this communicant? | Name |
| | | Avatar Color |
| | | Photo |
| | | Status Message |
| | | Role (e.g., Guest, Member, Moderator, Owner) |
| Application-Sspecific Availability | Is this person available now? | Idle/Sleeping |
| | | Busy |
| Channels Supported by Client of Focus | How can I communicate with this communicant? | Chat |
| | | Audio Sink (e.g., Speaker) |

-continued

| STATE | DESCRIPTION | ATTRIBUTES |
| --- | --- | --- |
| | | Audio Source (e.g., Microphone) |
| | | Video Sink (e.g., Display) |
| | | Video Source (e.g., Screen Share) |
| | | Video Source (e.g., Webcam) |
| | | File Transfer |
| Client of Focus | Which network service is communicant currently using? | Client Name (e.g., Sococo, Yahoo!, Windows Live Messenger, Google Talk, Facebook, etc.) |
| | | Client Version |
| Station of Focus | Which client network node is communicant currently using? | Operating System (e.g., XP, Vista, Windows 7, MacOS, iPhone, Windows Mobile, etc.) |
| | | OS Version |
| | | Device Type (e.g., Desktop Computer, Smart Phone, Phone, etc.) |

The Online/Offline state indicates whether or not the communicant currently is available for communication. In the illustrated embodiments, a communicant is in the Online state when the communicant is connected to the network communication environment (e.g., by establishing a presence with respect to one or more of the virtual area applications 46), and the communicant is in the Offline state when the communicant is unconnected to the network communication environment (e.g., by not having a presence with respect to any of the virtual area applications 46).

The Location of Presence state indicates where the communicant has established a presence in the network communication environment. The Location of Presence typically has a respective attribute value (e.g., an application_ID and/or a zone_ID value) for each of the virtual area applications 44 and/or zones of the virtual area applications 46 in which the user has presence.

The Application-Specific Identity Information is communicated to other communicants to indicate information about the communicant in the context of a particular virtual area application with which the communicant is associated. The Application-Specific Identity Information includes:
  an application-specific Name attribute that is used to identify the communicant to other communicants in the context of the virtual area application;
  an application-specific Avatar Color attribute that is used to set the color of an iconographic representation of the communicant in the context of the virtual area application;
  an application-specific Photo attribute that references a user-selected image that is associated with representations of the communicant in the context of the virtual area application;
  an application-specific Status Message attribute that references a message that is associated with representations of the communicant in the context of the virtual area application; and
  an application-specific Role attribute that indicates a role (e.g., Guest, Member, Moderator, Owner) of the communicant that may be used for switching data streams to communicants in the context of the virtual area application.

The Application-Specific Availability state indicates the availability of the communicant in the context of the virtual area application. The Application-Specific Availability state typically includes an attribute value that indicates when the communicant is idle or sleeping and an attribute value that indicates when the communicant is busy.

The Station of Focus state characterizes the client network node from which the communicant is operating. The Station of Focus state typically includes attributes that identify the Device Type of the client network node, the Operating System (OS) running on the client network node, and the OS Version of the operating system.

The Client of Focus state indicates the virtual area application with which the communicant currently has focus. The Client of Focus state typically includes a Client Name attribute that identifies client communication application with which the communicant is communicating with the virtual area application, and a Client Version attribute that identifies the version of the client communication application.

The Channels Supported by Client of Focus state indicates the communication channels that are available for communicating with the communicant in the context of the user's client application. The Channels Supported by Client of Focus state typically includes a Chat attribute that indicates whether or not the user's client application supports chat communications with the communicant, Audio Sink and Audio Source attributes that respectively indicate whether or not the user's client application supports audio sink and audio source communications with the communicant, Video Source and Video Sink attributes that respectively indicate whether or not the user's client application supports video sink and video source communications with the communicant, and File Transfer attribute that indicates whether or not the user's client application supports file transfer communications with the communicant.

Exemplary communicant activities include the channels that the communicant currently has open for communication, which indicates how the communicant currently is interacting with other communicants. In some examples, the activities that a user of the voice-based navigation system can ascertain about a communicant include the following attributes of an Open Channels object:
  an IsListening attribute that indicates when the communicant's audio sink channel (e.g., speaker) is open;
  a HasMicOpen attribute that indicates when the communicant's audio source channel (e.g., microphone) is open;
  an IsSpeaking attribute that indicates when the amplitude of the audio being transmitted on the communicant's audio source channel;

an IsWatching attribute that indicates when video data being streamed to the communicant's video sink channel is displayed on the screen;

an IsTyping attributes that indicates when a user is actively typing into an input box for the communicant's chat channel;

a HasApplicationShareFocus attribute that indicates when application sharing data is being streamed to the communicant on the communicant's application sharing video sink channel;

a HasWebCamOn attribute that indicates when the communicant's webcam video source channel is open;

a HasChatInputFocus attribute that indicates when the communicant's client network node indicates that the communicant has focus on the communicant's chat channel; and an ObjectOfFocus attribute that indicates what object in a zone the communicant is looking at in the Viewer pane.

Figure 7:
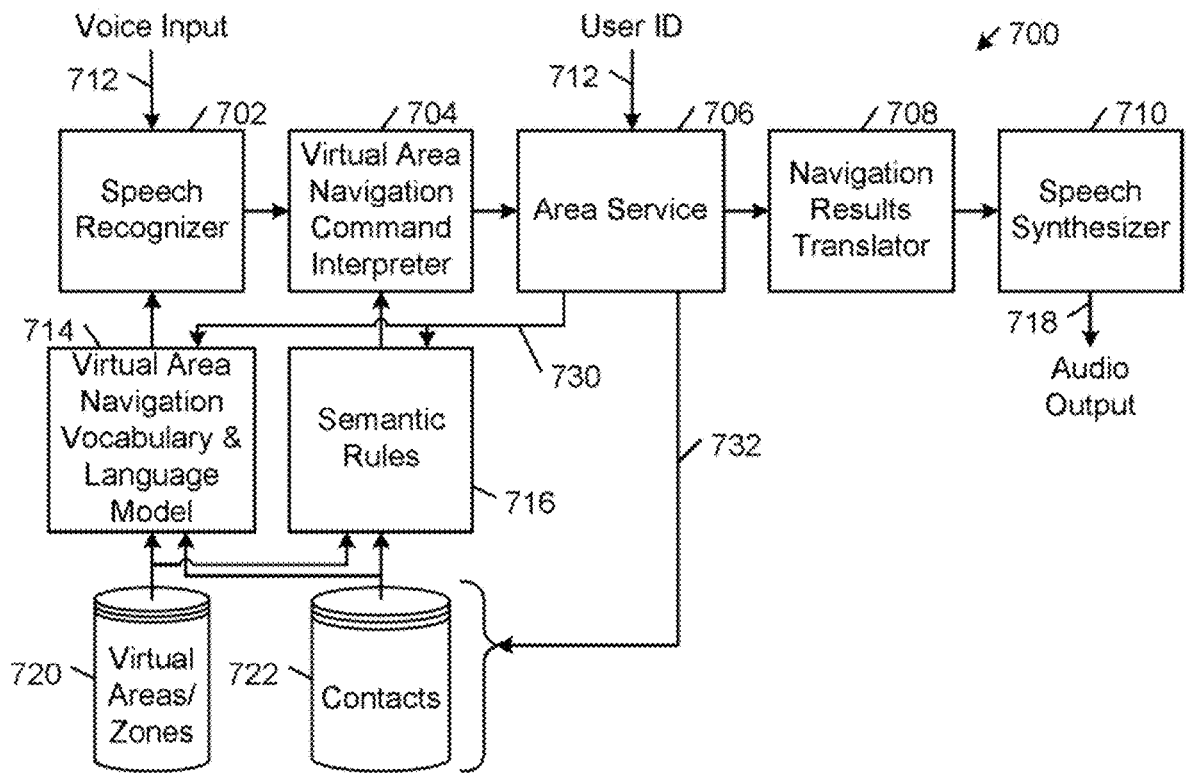
FIG. 7 is a block diagram of an example of a voice-based virtual area navigation architecture.

FIG. 7 shows an example of a voice-based virtual area navigation architecture 700 that includes a speech recognizer 702, a virtual area navigation command interpreter 704, an area service 706, a navigation results translator 708, and a speech synthesizer 710.

In some examples, a voice-based virtual area navigation session begins with the detection of a distinctive sound pattern or phrase that is recognized by the speech recognizer 702 as a command to initiate the command recognition process. In some of these examples, the command recognition process is initiated in response to receipt of a distinctive nonlinguistic vocal sound (e.g., one or more tongue clicking sounds).

The speech recognizer 702 converts voice input 712 into grammatically correct text in accordance with constraints that are imposed by a virtual area navigation vocabulary and a language model 714. The speech recognizer 702 generates recognized output (e.g., text) that represents the most likely words that were uttered in the voice input 712 based on the vocabulary and grammar 714. The speech recognizer 702 may include one or more of a continuous speech recognizer that attempts to recognize fluently spoken speech in the voice input 712 and an isolated word recognizer that attempts to detect commands (also referred to as actions) and operands (also referred to as arguments or modifiers) by focusing on keywords in the voice input 712.

The vocabulary specifies the set of words that can be recognized by the speech recognizer 702. Some examples use a small vocabulary of commands and operands without an explicit grammar (e.g., all word sequences are possible), whereas other examples may use larger vocabularies with word grammars that impose different levels of constraint on the types of word sequences that are allowed.

In the illustrated example, the speech recognizer 702 uses a vocabulary that includes a small set of fixed commands and a set of operands that is configured dynamically by the area service 706 based on data associated with the user. In some examples, the set of operands are constrained to the names of the virtual areas, virtual area zones, or contacts that are associated with the user. In other examples, the operands are not limited to the values that are associated with the user. In some of these examples, however, the speech recognizer 702 preferentially selects the operand values that are associated with the user. For example, the operands may consist of all or a subset of all the values that are possible in the virtual communications environment 10 (e.g., the names of all of the virtual areas, virtual area zones, and communicants that are associated with the virtual area platform 18), but the values that are associated with the user are assigned higher probabilities in the lexical decoding process that is used to estimate recognized word probabilities.

The language model specifies which combinations of words (e.g., commands and operands) are allowable. In some examples, the language model specifies a syntax (e.g., the navigation command syntax described below) that defines the combinations of words that form grammatically correct strings (e.g., commands and their respective operands). In some examples, syntactically correct word combination hypotheses are allowed, whereas syntactically incorrect word combination hypotheses are disallowed. In some of these examples, the allowable syntactically correct word combinations are assigned respective probability values based on information about he user (e.g., the user's current status—such as state and activity, as described above—in one or more virtual areas, the user's current set of capabilities in the virtual area as defined by the permission rules, the communicants in the user's contact list, and attributes associated with the user).

The virtual area navigation command interpreter 704 uses statistical or rules-based methods to extract one or more virtual area navigation commands and zero of more operands from the recognized output based on a set of semantic rules 716. The virtual area navigation command interpreter uses the semantic rules 716 to validate the recognized output received from the speech recognizer 702. In some examples, the semantic rules 716 ensure that the recognized output is consistent with the task being performed or the user's state. In some examples, the semantic rules 716 specify how the likelihoods of certain combinations of commands and operands should be modified based on information about external conditions, facts, or elements of the network communications environment associated with the user and the virtual area application in relation to the semantic values of those combinations of commands and operands. In some examples, the semantic rules 716 assign low probabilities to commands or command/operand combinations that are not allowed based on the status of the user at the time the command or command/operand combination was received. For example, the semantic rules may dynamically assign a lower probability to a command to Go to a virtual area or zone of which the user is not a member or for which the user does not have the requisite capability than it assigns to a command to Go to a virtual area or zone of which the user is a member or has the requisite capability. In addition, the semantic rules may assign a lower probability to a command to GET or FIND a communicant that is not a contact of the user than it assigns to a command to GET or FIND a communicant that is a contact of the user. The extracted commands and operands are passed to the area service 706

The area service 706 is a component of the network infrastructure service environment. In some examples, the area service 706 administers virtual areas, manages network connections that are associated with the virtual area subject to the capabilities of the requesting entities, maintains global state information for the virtual area, and serves as a data server for the client network nodes participating in a shared communication session in a context defined by the virtual area. The area service 706 provides the context-dependent information to the speech recognizer 702 and the virtual area navigation command interpreter 704. This information includes, for example, user-specific data 730 (e.g., the user's contact list information 722 and information 720 that relates to the areas/zones that are associated to the user) and user status data 732 (e.g., the current state and activity of the user). The area service 706 also executes the tasks corresponding to the extracted virtual area navigation commands and operands; in this process, navigation results are generated (e.g., by one or more of the area service, other components of the network infrastructure service, or other network entities).

The navigation results are passed to a navigation results translator 708, which formats the navigation results into a format that can be converted into audio output 718 (e.g., a synthesized speech data that the client network node 12 can render) by the speech synthesizer 710.

The components 702-710 of the architecture 700 may be allocated to the client network node 12 and the virtual area platform 18 in different ways. In some examples, all of the components 702-710 of the voice-based virtual area navigation architecture 700 are allocated to the virtual area platform 18; the client network node 12 sends recorded voice files to the virtual area platform 18 for processing and receives in return sound files containing synthesized speech report of the navigation results. In other examples, the client network node 12 performs front-end signal processing (e.g., speech detection, such as voice activity detection and speech boundary detection, and feature extraction, such as MFCC (Mel-Frequency Cepstral Coefficient) feature extraction) on the voice input and the remaining functions of the speech recognizer 702, as well as the functions of the other components 704-710 of the voice-based virtual area navigation architecture 700, are performed by the virtual area platform 18. In still other embodiments, the speech recognizer 702 is allocated to the client network node 12 and the other components 704-710 of the voice-based virtual area navigation architecture 700 are allocated to the virtual area platform.

In some examples, the following virtual area navigation commands and associated syntax are defined:

LOOK {<zone>|<area/zone>}
FIND <contact>|<meeting>
GO <contact>|HOME|<zone>|<area>|<area/zone>
GET <contact>
YES
NO These commands have the following semantics:

LOOK

LOOK with no modifier reports who else is in the user's current zone of presence.

LOOK optionally can be modified by: a zone name (e.g., "LOOK Main"), which reports who is in the specified zone in the current virtual area in which the user is present; or an area/zone pair (e.g., "LOOK Sococo Corporate Lobby"), which reports who else in the specified zone in the specified virtual area.

In some examples, connector words such as "in" or "of" are accepted in the syntax, although anything that requires true parsing rather than a comparison within a restricted vocabulary will lower the recognition success rate.

In some examples, the LOOK command additionally reports one or more attributes of the status of each of the communicants in the pertinent zone (e.g., is the communicant currently available, which channels (modes or channels of communication) can be used to communicate with the communicant, and what is communicant currently doing—e.g., is the communicant currently interacting with other communicants and, if so, how).

FIND

FIND with a specified contact operand (e.g., "FIND Paul Brody") reports the current zone, or virtual area and zone if in a different virtual area than the user's current virtual area of presence, of the specified contact.

FIND with a specified meeting name operand (e.g., FIND "Daily Standup") reports the zone or virtual area and zone if in a different virtual area than the user's current zone of presence in which a meeting having the specified meeting name is taking place.

In some examples, the FIND command additionally reports one or more attributes of the status of each of the communicants in the pertinent zone (e.g., is the communicant currently available, which channels (modes or channels of communication) can be used to communicate with the communicant, and what is communicant currently doing—e.g., is the communicant currently interacting with other communicants and, if so, how).

GO

GO moves the user's presence to either the zone of the specified contact operand (e.g., "GO Paul Brody"), a specified zone of the user's current virtual area of presence (e.g., "GO West Conference"), a default zone of a specified area (e.g., "GO Sococo Corporate" might move the user's presence to the Lobby of the Sococo Corporate virtual area), a specified zone of the specified virtual area (e.g., "GO Sococo Corporate Lobby"), or the user's home zone (e.g., "GO Home"), which is a zone of a virtual area that is designated as the user's home zone (e.g., the user's virtual office).

In some examples, the GO command additionally reports one or more attributes of the status of each of the communicants in the zone to which the user's presence has been moved (e.g., is the communicant currently available, which channels (modes or channels of communication) can be used to communicate with the communicant, and what is communicant currently doing—e.g., is the communicant currently interacting with other communicants and, if so, how).

GET

GET sends a get message to the specified contact operand.

In some examples, in response to receipt of a GET command, a service (e.g., the area service or another service of the network infrastructure service environment 42) asks the user whether a voice message should accompany the get message and, if the user gives an affirmative reply (e.g., by saying "YES"), the service prompts the user to speak a voice message, records the voice message, and includes the voice message with the get message that is sent to the specified contact. In some examples, instead of sending the voice message, the service translates the voice message into a text message using a speech-to-text processor and sends the text message with the get message that is sent to the specified contact.

YES

YES indicates an affirmative response to an input choice.

NO

NO indicates a negative response to an input choice.

Figure 8:
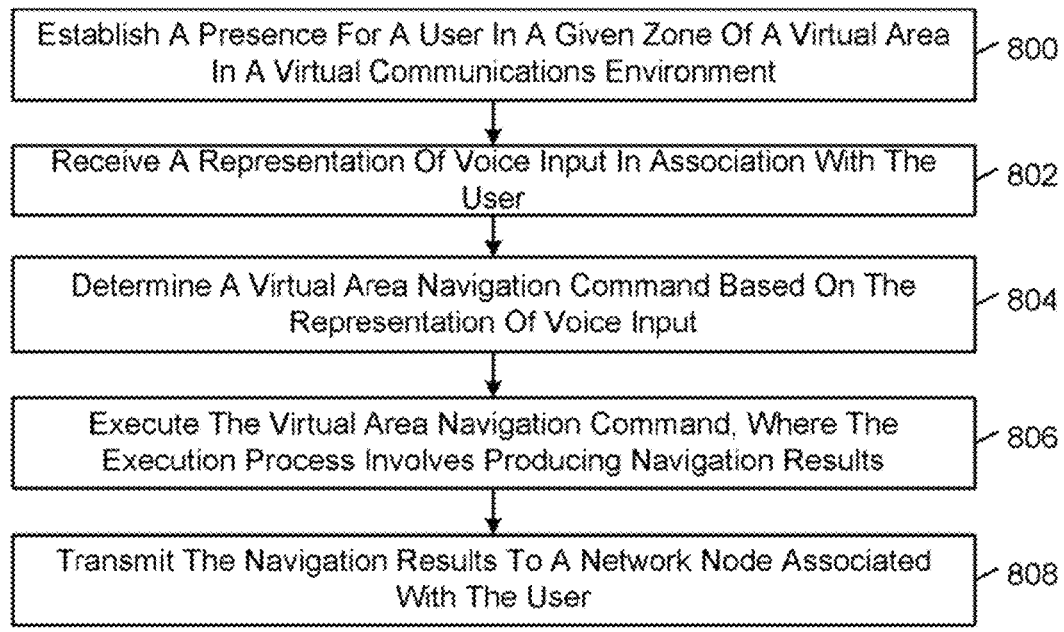
FIG. 8 is a flow diagram of an example of a voice-based virtual area navigation method.

FIG. 8 shows an example of a method by which the server network node 42 operates to provide voice-based virtual area navigation.

In accordance with the method of FIG. 8, the server network node 42 establishes a respective presence of a user in a given zone of a virtual area in a virtual communications environment (FIG. 8, block 800). The virtual area typically includes multiple zones, where each of respective ones of the zones defines a respective context for realtime communications between network nodes of respective communicants who are present in the zone. The server network node 42 receives a representation of voice input in association with the user (FIG. 8, block 802). The server network node 42 determines a virtual area navigation command based on the representation of voice input (FIG. 8, block 804). The server network node 42 executes of the virtual area navigation command, which involves producing navigation results (FIG. 8, block 806). The server network node 42 transmits the navigation results to a network node associated with the user (FIG. 8, block 808).

Examples of the method of FIG. 8 enable the user to use voice commands to search for communication opportunities in the different communications contexts that are available in one or more virtual areas, enter specific ones of such virtual communication contexts, and bring other communicants into specific ones of such virtual communication contexts.

In some examples, the voice input representation that is received by the server network node 42 (FIG. 8, block 802) includes a sound file of speech recorded by the client network node 12. In other examples, the voice input representation is a feature-based representation of speech that is produced by the client network node 12. In still other examples, the voice input includes a text-based representation of speech that was recognized by the client network node 12.

In some examples, in the process of determining the virtual area navigation command (FIG. 8, block 804), the server network node 42 ascertains one or more constraints for recognizing words in the representation of voice input based on data associated with the user, and determines the virtual area navigation command based on the one or more constraints and the representation of voice input.

In some examples, the process of ascertaining the one or more constraints involves determining a restricted vocabulary of words (to which the recognition of words in the representation of voice input is limited) based on the data associated with the user. In some examples, this process involves including names of virtual areas associated with the user in the vocabulary. In some examples, this process involves including names of virtual area zones associated with the user in the vocabulary. In some examples, the process involves including names of communicants associated with the user in the vocabulary.

In some examples, the process of ascertaining the one or more constraints involves determining a language model for recognizing words in the representation of voice input based on the data associated with the user. In some examples, the determined language model includes a specification of allowable combinations of virtual area names and zone names to which words in the representation of voice input are limited.

In some examples, the virtual area navigation command involves navigating the user's attention in the virtual communications environment. Examples of such commands include the LOOK and FIND commands described above.

In some of these examples, the virtual area navigation command is a communicant presence reporting command. In some examples, the navigation results include a list of communicants who are present in a particular one of the zones of the virtual area. In some of these examples, the navigation results include indications of activities being performed by respective ones of the communicants who are present the particular zone. The navigation results also may include indications of which communicants in the zone are performing one or more of talking, text chatting, and application sharing in the particular zone. In some examples, the server network node 42 determines whether the representation of voice input indicates a respective one of the zones of the virtual area in connection with the communicant presence reporting command. In response to a determination that the representation of voice input fails to indicate any of the zones of the virtual area in connection with the communicant presence reporting command, the server network node 42 executes the communicant presence reporting command with respect to the given zone in which the user currently is present. In response to a determination that the representation of voice input indicates a respective one of the zones of the virtual area in connection with the communicant presence reporting command, the server network node 42 executes the communicant presence reporting command with respect to the indicated zone. The indicated zone may be different from the given zone in which the user currently is present.

In some examples, in connection with the communicant presence reporting command, the server network node 42 determines in the representation of voice input an indication of a particular zone of a second virtual area of multiple zones in the virtual communications environment. The user may or may not be present in the second virtual area. In some of these examples, the navigation results include a list of communicants who are present in the particular zone of the second virtual area.

In some examples, in connection with the communicant presence reporting command, the server network node 42 determines in the representation of voice input an indication of a particular communicant. In some of these examples, the server network node 42 executes the communicant presence reporting command with respect to the particular communicant, and the navigation results include an indication of a zone in which the particular communicant is present. In some examples, the indicated zone is a zone of the virtual area in which the user currently is present. In some examples, the indicated zone is a zone of a second virtual area in which the user is not present.

In some examples, the server network node 42 determines in the voice input an indication of a particular assembly of communicants in the virtual area. In some of these examples, the server network node 42 executes the communicant presence reporting command with respect to the particular assembly of communicants, and the navigation results include an indication of a zone in which the particular assembly of communicants is occurring.

In some examples the process of executing the virtual area navigation command involves navigating a communicant's presence in the virtual communications environment. Examples of such commands include the GO and GET commands described above.

In some of these examples, the virtual area navigation command is a user presence navigation command for navigating the user's presence in the virtual communications environment. In some examples, in connection with the user presence navigation command, the server network node 42 determines in the voice input an indication of a respective one of the zones of the virtual area; the server network node executes the user presence navigation command with respect to the indicated zone, and in the process moves the user's presence to the indicated zone. The navigation results may include an indication that the user's presence has been moved to the indicated zone. The navigation results also may include a list of communicants who are present in the indicated zone.

In some of these examples, the server network node 42 determines in the voice input a verbal connotation of a home in connection with the user presence navigation command. Based on this determination, the server network node 42 executes the user presence navigation command with respect to a particular one of the zones of the virtual area that is designated as the user's home zone, and in the process moves the user's presence to the particular zone. In these examples, the navigation results may include an indication that the user's presence has moved to the particular zone.

In some examples, the server network node 42 determines in the voice input an indication of a particular zone of a second virtual area of multiple zones in the virtual communications environment in connection with the user presence navigation command; the server network node 42 executes the user presence navigation command with respect to the indicated zone, and in the process moves the user's presence to the indicated zone. The user may or may not be present in the second virtual area. The navigation results may include an indication that the user's presence has moved to the indicated zone.

In some examples, the server network node 42 determines in the voice input an indication of a particular communicant in connection with the user presence navigation command. In some of these examples, the server network node 42 executes the user presence navigation command with respect to the particular communicant, and in the process moves the user's presence to a particular zone in which the particular communicant currently is present. The navigation results typically include an indication that the user's presence has moved to the particular zone.

In some examples, the virtual area navigation command is a contact presence navigation command for navigating the presence of a particular one of the user's contacts to a location (e.g., a zone) in the virtual communication environment. In some of these examples, in connection with the contact presence navigation command, the server network node 42 determines in the voice input an indication of a particular contact of the user. Based on this determination, the server network node 42 executes the contact presence navigation command with respect to the particular communicant contact. In some examples, the process of executing the contact presence navigation command involves inviting the particular communicant to the particular zone, in which case the navigation results may include an indication that the particular contact has been invited to the particular zone.

In some examples, in connection with the contact presence navigation command, the server network node 42 determines whether the voice input indicates a respective one of the zones of the virtual area. In response to a determination that the voice input fails to indicate any of the zones of the virtual area in connection with the contact presence navigation command, the server network node 42 invites the particular contact to the given zone in which the user is present. In response to a determination that the voice input indicates a respective one of the zones of the virtual area in connection with the contact presence navigation command, the server network node 42 invites the particular contact to the indicated zone.

Figure 9:
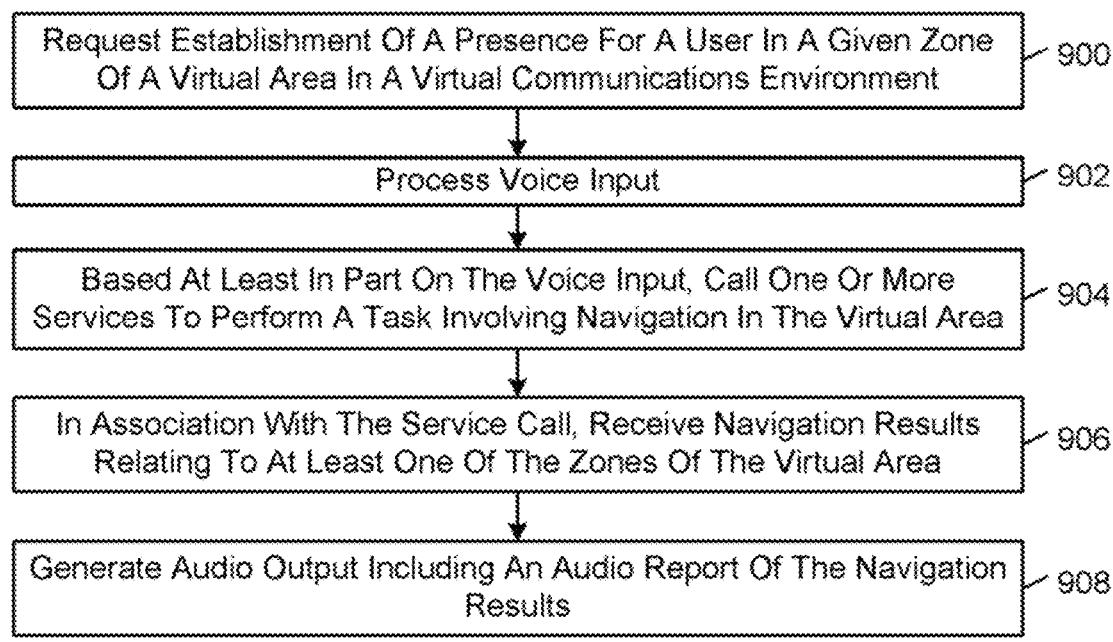
FIG. 9 is a flow diagram of an example of a voice-based virtual area navigation method.

FIG. 9 shows an example of a method by which the client network node 12 provides voice-based virtual area navigation.

In accordance with the method of FIG. 9, the client network node 12 establishes a respective presence of a user in a given zone of a virtual area in a virtual communications environment (FIG. 9, block 900). The virtual area typically includes multiple zones, where each of respective ones of the zones defines a respective context for realtime communications between network nodes of respective communicants who are present in the zone. The client network node 12 processes voice input (FIG. 8, block 802). Based at least in part on the voice input, the client network node 12 calls one or more services to perform a task involving navigation in the virtual area (FIG. 9, block 904). In association with the service call, the client network node 12 receives navigation results relating to at least one of the zones of the virtual area (FIG. 9, block 906). In some examples, the client network node 12 receives the navigation results from the server network node providing one or more of the services that are called to perform the determined task. In some examples, a remote server network node provides at least one of the one or more services, where the client network node 12 receives the navigation results from the remote server network node. The client network node 12 generates audio output that includes an audio report of the navigation results (FIG. 9, block 908).

In some examples, the processing of the voice input (FIG. 9, block 904) is initiated in response to receipt of a distinctive nonlinguistic vocal sound (e.g., a tongue clicking sound). In some examples, the processing involves recording input speech into a sound file and sending the sound file to one or more of the called services. In other examples, the processing involves generating a feature-based representation of input speech and sending the feature-based representation to one or more of the called services. In still other examples, the processing involves recognizing commands and parameters in the voice input and sending the recognized commands and parameters to one or more of the called services.

In some examples, a remote server network node (e.g., the server network node 40) provides at least one of the one or more services for performing the determined task (FIG. 9, block 904).

In some examples, based at least in part on the voice input, the client network node 12 ascertains a command that involves navigating the user's attention in the virtual communications environment. Examples of such commands include the LOOK and FIND commands described above.

In some of these examples, the ascertained command is a communicant presence reporting command. In some of these examples, the navigation results include a list of communicants who are present in a particular one of the zones of the virtual area, in which case the generated audio output (FIG. 9, block 908) includes an audio report of the communicants who are present in the particular zone. The navigation results also may include indications of activities being performed by respective ones of the communicants present the particular zone, in which case the generated audio output comprises an audio reports of the activities. The navigation results also may include indications of which communicants in the zone are performing one or more of talking, text chatting, and application sharing in the particular zone.

In some examples, the client network node 12 determines in the voice input an indication of a particular zone of a second virtual area of multiple zones in the virtual communications environment in connection with the communicant presence reporting command. The user may or may not be present in the second virtual area. In these examples, the navigation results may include a list of communicants who are present in the particular zone of the second virtual area, in which case the generated audio output includes an audio report of the communicants who are present in the particular zone of the second virtual area.

In some examples, the client network node 12 determines in the voice input an indication of a particular communicant in connection with the communicant presence reporting command. In some of these examples, the determined task includes executing the communicant presence reporting command with respect to the particular communicant. In some of these examples, the navigation results include an indication of a zone in which the particular communicant is present, and the generated audio output includes an audio report relating to the indicated zone.

In some examples, the client network node 12 determines in the voice input an indication of a particular assembly of communicants in the virtual area. In some of these examples, the determined task includes executing the communicant presence reporting command with respect to the particular assembly of communicants. In some of these examples, the navigation results include an indication of a zone in which the particular assembly of communicants is occurring, and the generated audio output includes an audio report relating to the indicated zone.

In some examples, based at least in part on the voice input, the client network node 12 ascertains a command that involves navigating a communicant's presence in the virtual communications environment. Examples of such commands include the GO and GET commands described above.

In some of these examples, the ascertained command is a user presence navigation command for navigating the user's presence in the virtual communications environment. In some examples, the client network node 12 determines in the voice input an indication of a respective one of the zones of the virtual area in connection with the user presence navigation command. In some of these examples, the determined task includes executing the user presence navigation command with respect to the indicated zone. In some of these examples, the navigation results may include an indication that the user's presence has moved to the indicated zone, in which case the generated audio output comprises an audio report that the user has entered the indicated zone. The navigation results may include a list of communicants who are present in the indicated zone, in which case the generated audio output comprises an audio report of the communicants who are present in the indicated zone.

In some examples, the client network node 12 determines in the voice input a verbal connotation of a home in connection with the user presence navigation command, in which case the determined task includes executing the user presence navigation command with respect to a respective one of the zones of the virtual area that is designated as the user's home zone.

In some examples, the client network node 12 determines in the voice input an indication of a particular zone of a second virtual area of multiple zones in the virtual communications environment in connection with the user presence navigation command, where the user is not present in the second virtual area. In some of these examples, the determined task includes executing the user presence navigation command with respect to the indicated zone. In some of these examples, the navigation results include an indication that the user's presence has moved to the indicated zone, in which case the generated audio output include an audio report that the user has entered the indicated zone.

In some examples, the client network node 12 determines in the voice input an indication of a particular communicant in connection with the user presence navigation command. In some of these examples, the determined task includes executing the user presence navigation command with respect to the particular communicant. In some of these examples, the navigation results include an indication that the user's presence has moved to a zone in which the particular communicant is present, in which case the generated audio output include an audio report that the user has entered the indicated zone.

In some examples, the ascertained command is a contact presence navigation command for navigating the presence of a respective one of the user contacts in the virtual communication environment.

In some examples, the client network node determines in the voice input an indication of a particular contact of the user, in which case the determined task includes executing the contact presence navigation command with respect to the particular contact. In some of these examples, the navigation results include an indication that the particular contact has been invited to a particular zone of the virtual area, in which case the generated audio output comprises an audio report that the particular contact has been invited to a particular zone of the virtual area.

In some examples, the client network node 12 determines whether the voice input indicates a respective one of the zones of the virtual area in connection with the contact presence navigation command. In response to a determination that the voice input fails to indicate any of the zones of the virtual area in connection with the contact presence navigation command, the determined task includes executing the contact presence navigation command with respect to the particular contact and the given zone in which the user is present. In some of these examples, the navigation results comprise an indication that the particular communicant contact has been invited to the given zone, in which case the generated audio output includes an audio report that the particular contact has been invited to the given zone. In response to a determination that the voice input indicates a respective one of the zones of the virtual area in connection with the contact presence navigation command, the determined task includes executing the contact presence navigation command with respect to the particular contact and the indicated zone. In some of these examples, the navigation results include an indication that the particular contact has been invited the indicated zone, in which case the generated audio output includes an audio report that the particular contact has been invited to the indicated zone.

III. CONCLUSION

Other embodiments are within the scope of the claims.

The invention claimed is:

1. A computer-implemented method in a network communications environment implemented by at least one server network node and supporting realtime communications between a user and one or more other communicants who are operating respective client network nodes and are co-present in any of multiple virtual locations of a virtual area that define different respective communication contexts in the network communications environment, the method comprising:

processing voice input from the user;

calling one or more services associated with the network communications environment to perform operations comprising detecting in the processed voice input a navigation command in a fixed set of navigation commands each of which is associated with a respective syntax, wherein the fixed set of navigation commands comprises a look command and a find command, wherein in response to the user vocalizing the look command with no modifier causes one of the services to send to the user a report of who else is in the user's current virtual location of presence in the virtual area and in response to the user vocalizing the look command with a specified virtual location in the virtual area causes one of the services to send to the user a report of who is in the specified virtual location in the virtual area, wherein the user vocalizing the find command with a specified contact operand causes one of the services to send to the user a report of the current virtual location of the specified contact in the virtual area, and the user vocalizing the find command with a specified name of a meeting in the virtual area causes one of the services to send to the user a report of the virtual location of the meeting with the specified name in the virtual area, wherein the detecting comprises probabilistically scoring a set of navigation commands based on application of semantic rules that measure consistency of the navigation commands with the user's current state or activity in the virtual area and, based on the scoring, selecting one of the navigation commands as the detected navigation command, ascertaining one or more operands based on the processed voice input and the syntax associated with the detected navigation command, wherein the ascertaining comprises selecting the one or more operands from one or more of names associated with respective ones of the virtual locations and names associated with respective ones of the communicants based on relationship data indicating one or more of whether the user is a member of any of the respective ones of the virtual locations and whether any of the respective ones of the communicants is a contact of the user, and producing navigation results comprising navigating an attentional focus or state of the user from a current virtual location to another virtual location based on application of the detected navigation command to the one or more ascertained operands.

2. The method of claim 1, wherein the one or more of names associated with respective ones of the virtual locations and names associated with respective ones of the communicants are configured dynamically by the at least one server network node based on data currently associated with the user.

3. The method of claim 1, wherein the one or more of names associated with respective ones of the virtual locations and names associated with respective ones of the communicants comprise names that are related to the user and names that are unrelated to the user, and the selecting comprises preferentially selecting ones of the names that currently are associated with the user over other ones of the names.

4. The method of claim 1, wherein the detecting and the ascertaining comprises:

forming grammatically correct word combinations of commands selected from the fixed set of navigation commands and operands selected from the one or more names associated with respective ones of the virtual locations and the names associated with respective ones of the communicants based on the relationship data according to the respective navigation command syntaxes; and preferentially selecting a respective one of the formed grammatically correct word combinations based on information about the user.

5. The method of claim 4, wherein the information about the user comprises names of communicants who are contacts of the user.

6. The method of claim 1, wherein the fixed set of navigation commands comprises a look command; and wherein when the look command is detected in the processed voice input:

an unsuccessful ascertainment of a virtual location operand for the look command in the processed voice input results in selecting a current virtual location of presence of the user in the network communications environment as the ascertained operand, and returning in the navigation results a list of communicants who are present in the user's current virtual location of presence; and a successful ascertainment of a virtual location operand for the look command in the processed voice input results in returning in the navigation results a list of communicants who are present in the respective one of the virtual locations in the network communications environment corresponding to the ascertained virtual location operand without the user being present in the respective virtual location.

7. The method of claim 6, wherein each returning comprises returning in the navigation results one or more status attributes of each communicant in the respective list of communicants.

8. The method of claim 1, wherein, when the find command is detected in the processed voice input, a successful ascertainment of a communicant name operand for the find command in the processed voice input results in returning in the navigation results an identification of a respective one of the virtual locations in which a communicant corresponding to the communicant name operand is present.

9. The method of claim 8, wherein the returning comprises returning in the navigation results one or more status attributes of each communicant who is present in the identified virtual location.

10. The method of claim 1, wherein, when the find command is detected in the processed voice input, a successful ascertainment of a meeting name operand for the find command in the processed voice input results in returning in the navigation results an identification of a respective one of the virtual locations in the network communications environment corresponding to the ascertained meeting name operand.

11. The method of claim 10, wherein the returning comprises returning in the navigation results one or more status attributes of each communicant who is present in the identified virtual location.

12. The method of claim 1, wherein the fixed set of commands comprises a go command and, when the go command is detected in the processed voice input, a successful ascertainment of a communicant name operand for the go command in the processed voice input results in moving the presence of the user to a respective one of the virtual locations in which a communicant corresponding to the communicant name operand is present.

13. The method of claim 1, wherein the fixed set of commands comprises a go command and, when the go command is detected in the processed voice input, a successful ascertainment of a virtual location name operand for the go command in the processed voice input results in moving the presence of the user to a respective one of the virtual locations corresponding to the virtual location name.

14. The method of claim 1, further comprising generating audio output comprising synthesized speech reporting the navigation results.

15. The method of claim 1, wherein application of the detected navigation command to the one or more operands produces navigation results comprising initiating a meeting between the user and one or more other communicants in a designated one of the virtual locations.

16. The method of claim 15, wherein application of the detected navigation command to the one or more operands produces navigation results comprising inviting the one or more other communicants to the designated virtual location.

17. The method of claim 1, wherein application of the detected navigation command to the one or more operands generates a recording of speech.

18. The method of claim 17, wherein application of the detected navigation command to the one or more operands produces a text based representation of the recorded speech.

19. The method of claim 1, wherein application of the detected navigation command to the one or more operands produces navigation results comprising reporting communicant activity in a designated meeting in a virtual location to the user.

20. Apparatus in a network communications environment implemented by at least one server network node and supporting realtime communications between a user and one or more other communicants who are operating respective client network nodes and are co-present in any of multiple virtual locations of a virtual area that define different respective communication contexts in the network communications environment, the apparatus comprising a non-transitory memory storing processor-readable instructions, and a processor coupled to the memory, operable to execute the instructions, and based at least in part on the execution of the instructions operable to perform operations comprising:

processing voice input from the user;

calling one or more services associated with the network communications environment to perform operations comprising detecting in the processed voice input a navigation command in a fixed set of navigation commands each of which is associated with a respective syntax, wherein the fixed set of navigation commands comprises a look command and a find command, wherein in response to the user vocalizing the look command with no modifier causes one of the services to send to the user a report of who else is in the user's current virtual location of presence in the virtual area and in response to the user vocalizing the look command with a specified virtual location in the virtual area causes one of the services to send to the user a report of who is in the specified virtual location in the virtual area, wherein the user vocalizing the find command with a specified contact operand causes one of the services to send to the user a report of the current virtual location of the specified contact in the virtual area, and the user vocalizing the find command with a specified name of a meeting in the virtual area causes one of the services to send to the user a report of the virtual location of the meeting with the specified name in the virtual area, ascertaining one or more operands based on the syntax associated with the detected navigation command, the processed voice input, and one or more of names of respective ones of the virtual locations that are associated with the user and names of communicants who are contacts of the user, and returning navigation results based on application of the detected navigation command to the one or more ascertained operands, wherein the detecting and the ascertaining comprises forming grammatically correct word combinations of commands selected from the fixed set of navigation commands and operands selected from one or more of the names associated with respective ones of the virtual locations and the names associated with respective ones of the communicants based on relationship data according to the respective navigation command syntaxes, and preferentially selecting a respective one of the formed grammatically correct word combinations based on information about the user; and generating audio output comprising synthesized speech reporting the navigation results.

* * * * *